E. ROUNDS.
TRANSMISSION MECHANISM.
APPLICATION FILED SEPT. 15, 1910.
1,015,639.
Patented Jan. 23, 1912.
2 SHEETS—SHEET 2.
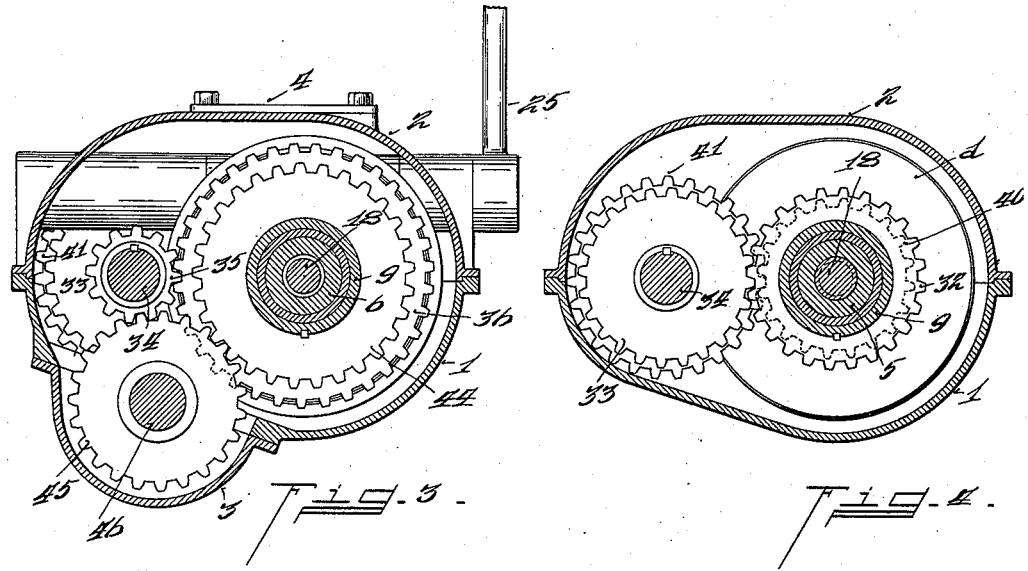
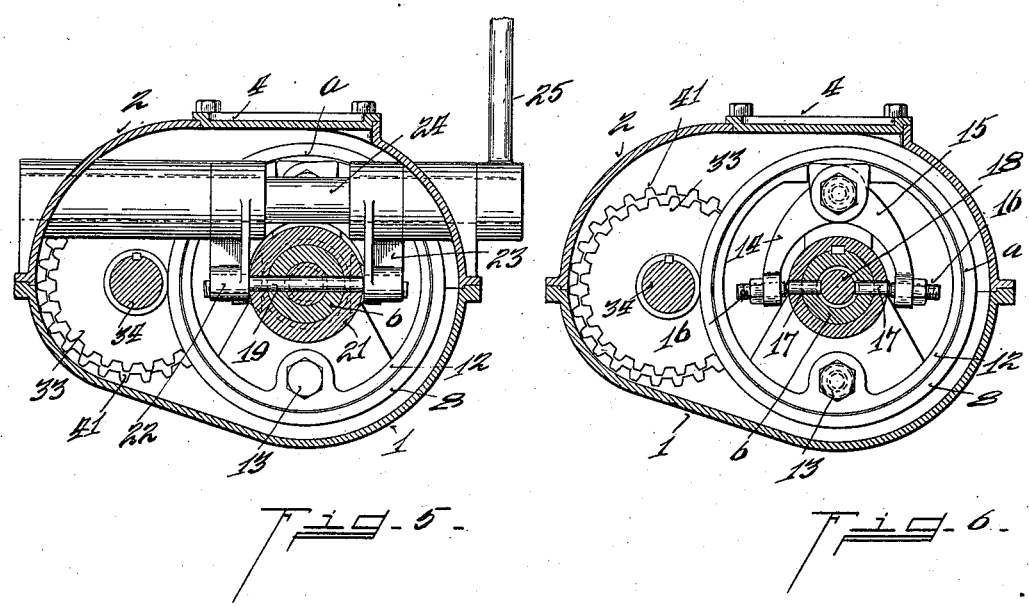

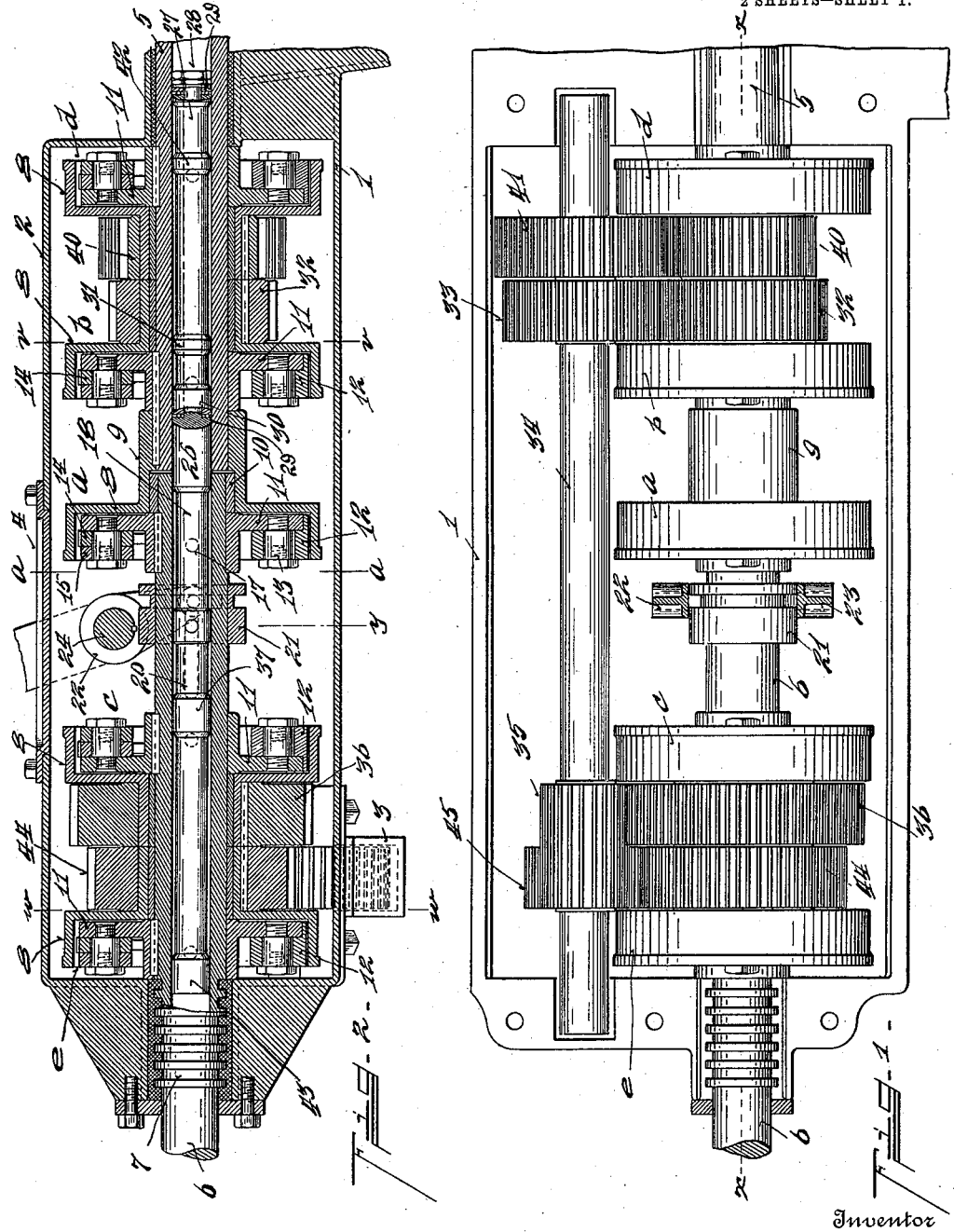

UNITED STATES PATENT OFFICE.

ERDIX ROUNDS, OF OWENSBORO, KENTUCKY, ASSIGNOR OF ONE-HALF TO GUNTHER-WRIGHT MACHINE COMPANY, OF OWENSBORO, KENTUCKY, A CORPORATION.

TRANSMISSION MECHANISM.

1,015,639.  Specification of Letters Patent.  Patented Jan. 23, 1912.

Application filed September 15, 1910. Serial No. 582,204.

*To all whom it may concern:*

Be it known that I, ERDIX ROUNDS, a citizen of the United States, residing at Owensboro, in the county of Daviess and State of Kentucky, have invented certain new and useful Improvements in Transmission Mechanism, of which the following is a specification.

My invention relates to an improvement in transmission mechanism, primarily employed in connection with power propelled vessels or vehicles and the like, in which compactness, weight, accessibility are important factors, as well as their control and durability.

The object of my invention is to provide a transmission mechanism having coaxially alined driver and driven shafts, clutching mechanism thereon for directly connecting said shafts, gear mechanism having different speed values connecting said shafts adapted to transmit motion around said clutch mechanism for an indirect drive controlled by a series of clutch mechanisms, with the clutching mechanism concentric with said shafts, and clutch actuating mechanism adapted to selectively engage said clutching mechanism for variously controlling the driving connections of said shafts.

Another object of my invention is to provide a transmission mechanism, with relatively alined driving and driven shafts, friction clutch mechanism mounted thereon, and a single clutch control concentric with the shafts, for independently controlling the clutch mechanism singly or in series as a unit.

Another object of my invention is to provide a transmission mechanism, with clutching devices relatively alined and clutch actuating mechanism in plane therewith, and its position of shift controlling the operation of the clutch mechanisms of the series.

Another object of my invention is to provide a transmission mechanism, with a series of relatively alined clutch mechanisms and driving and driven shafts, with clutch actuating means concentric with said shafts and clutches, for operating said clutches independently or in groups and trains of gearing interposed between said shafts and under the control of said clutches, for producing a variety of speed changes between driver and driven shafts or a reverse rotation.

Another object of my invention is to provide a transmission mechanism, with a series of friction clutches, means provided with a series of clutch engaging surfaces operating the same under predetermined lengths of movement, for independently or serially controlling the same.

Another object of my invention is to provide a transmission mechanism, with a series of forward varying speeds produced through trains of gearing, and clutch mechanism interposed between driving and driven shafts and relatively arranged to produce the varying speeds in progressive ratio and under the control of a single manipulating lever, whereby its various positions govern the operation of the various elements.

The features of the invention are more fully set forth in the description of the accompanying drawings, forming a part of this specification, in which:—

Figure 1 is a top plan view of my improvement, with the upper casing section removed. Fig. 2 is a section on line $x$, $x$, Fig. 1. Fig. 3 is a section on line $w$, $w$, Fig. 2. Fig. 4 is a section on line $v$, $v$, Fig. 2. Fig. 5 is a section on line $y$, Fig. 2. Fig. 6 is a section on line $a$, $a$, Fig. 2.

As illustrated in the drawings, the transmission mechanism is capable of controlling three forward varying speeds, reverse and release, by the manipulation of a single lever and particular type of clutch devices, but it is obvious that clutching mechanism of various forms and designs may be employed, to produce the same result, and it is also obvious that the ratio or number of forward speeds may be modified, without departing from the features of my invention.

The frame of the machine is of sectional type, and preferably forming the housing or casing, for completely inclosing the transmitting mechanism, so that the parts may be immersed in oil or other lubricant, and access to the interior readily and conveniently had.

1 represents the main casing section, 2 the top or cover section, and 3 a gear cap section for housing the reversing gearing.

4 represents a cover plate, adapted to be clamped upon the cover section 2.

5 represents the shaft journaled in a bearing formed in one end of the casing sections 1, 2.

6 represents a driven shaft coaxially alined with the drive shaft 5, and journaled in a bearing formed in the opposite end of the casing sections 1, 2. This shaft is provided with thrust rings or grooves 7, to prevent lateral thrusts or strains upon said shaft. The shafts 5 and 6 are hollow shafts with their bores alined, and through which clutch actuating mechanism is slid.

$a$ represents a friction clutch, comprising the following elements:—8 represents a cup-shaped disk, provided with a sleeve or hub-extension 9, telescopically engaged over and fixed to the drive shaft 5. 10 represents a collar engaged within the sleeve 9, of the disk 8, and over the end of the driven shaft 6, thereby forming an intermediate bearing connection for the two shafts, to maintain their alinement relatively with each other, and in continuity, dispensing with interior bearings therefor. 11 represents a disk within the cup-shaped disk 8, fixed to the driven shaft 6, and 12 represents an expansible and contractible split-ring, supported upon the disk 11, by means of a headed pin 13; the bore of the split ring 12, through which the pin 13 projects, is of larger diameter than the pin, permitting free movement of the ring thereon, in expanding and contracting the same. 14, 15, represent oppositely disposed levers pivotally mounted upon the disk 11, each adapted to engage a respective end of the split ring 12, to expand the same when the levers are actuated. It is obvious, however, that the friction clutch mechanism may be of any well known construction capable of being operated by means, hereinafter to be described, and the construction shown is merely a preferred type.

16 represent screw pins adjustably mounted, one upon each of the levers 14, 15, each adapted to engage a respective slide-pin 17, projected through the hub of the disk 11 and driven shaft 6, adapted to be engaged by the actuating rod 18, slidable within the bores of shafts 5, 6, see Figs. 2 and 6. This actuating rod is provided with a series of cam-surfaces, adapted to engage the respective pins 17 and move the same outward, swing the levers 14 and 15, expand the ring 12, within the cup-shaped disk 8, clamping the same thereto, and forming a driving connection between disks 8 and 11.

The clutch actuating rod 18 is shifted, as follows, see Figs. 2 and 5:—19 represents a rod or pin fixed to and projected beyond the actuating rod 18, preferably upon each side thereof, and through slots 20, of the driven shaft 6, and engaging with the shifting collar 21, slidably mounted upon the driven shaft 6, said collar is provided with an annular groove into which the arms 22, 23, engage, said arms being fixed to the rock shaft 24, one preferably upon each side of the collar, so as to provide uniformity of action.

25 represents a hand lever fixed to the rock shaft 24, for actuating the same. Shifting the lever 25 to the right to move the actuating rod 18 to the left, so as to bring the annular cam surface 26 thereof into engagement with the pins 17, of the friction clutch mechanism, or clutch $a$, will form a direct driving connection between shafts 5 and 6, for imparting a high speed. To produce a second speed, I provide a second clutch $b$, of substantially the same construction as that heretofore described for clutch $a$, but in which the disk 11 is fixed to the shaft 5, said disk carrying or supporting the split-ring 12, and levers 14, 15, and within the cup-shaped disk 8, and pins projected through the shaft 5, adapted to engage with the actuating rod 27, loosely connected upon the actuating rod 18, (see Fig. 2), ball bearings or other anti-friction means being provided between said actuating rods, such loose connection being preferable, especially when the driven shaft is rotating in the reverse direction from that of the driving shaft, and as illustrated, the actuating rod 27 is of tubular form, fitting over the stem extension 28, of the actuating rod 18, and with the ball bearings 29 inserted between the ends of rod 18 and rod 27, and the opposite end of the rod 27, and stem 28, the stem 28 being provided with nuts for adjusting the actuating rod 27, relatively to the ball bearings and upon the stem 28. The actuating rod 27 is provided with the annular cam surfaces 30 and 31, to respectively engage the clutch lever actuating pins 17, of the clutch $b$.

32 represents a gear fixed upon the hub extension of the cup-shaped disk 8, of clutch $b$, in mesh with a gear 33, fixed upon the intermediate shaft 34, suitably journaled within the casing sections 1, 2, see Figs. 2 and 4, and 35 represents an elongated gear fixed upon shaft 34, in mesh with a gear 36, fixed upon the hub extension of the clutch member 8, of friction clutch $c$, the disk 11 of said clutch $c$ is fixed to the driven shaft 6, and operated by means of the annular cam surface 37, formed on the actuating rod 18. Thus, by shifting the actuating rods 18 and 27, to bring the cam surfaces 37 and 31 respectively, into proper positions to actuate the respective pins 17 and frictionally clamp together the clutch members 8 and 11, of clutches c and b, a second forward speed is obtained through the driving shaft 5, clutch b, gears 32, 33, intermediate shaft 34, gears 35, 36, clutch c, to driven shaft 6. To produce a third forward speed, I provide the clutch d, in which the member 11 is fixed to the driving shaft 5, and the clutch member 8, upon its hub extension, as a gear 40, fixed thereto, in mesh with a gear 41, fixed upon the intermediate shaft 34. The actuating rod 28, is provided with an annular cam surface 42, adapted to engage the pins 17, of the clutch member d, when the actuating rod 28 is shifted to the left, frictionally connecting the members 11 and 8, of the clutch d, and the cam surface 37, of the actuating rod 18, is of sufficient length to maintain the clutch c, in commission or operate therewith, during the shifting of said rods, for respectively throwing clutches c and d into commission. Thus, when clutch d and c are in commission, a third forward speed is imparted from driving shaft 5, clutch d, gears 40, 41, intermediate shaft 34, gears 35, 36, clutch c to driven shaft 6.

To obtain a reverse rotation to the driven shaft 6, I provide the clutch e, with its member 11 fixed to the driven shaft 6, and the clutch actuating pins 17 thereof adapted to engage with the annular cam surface 43, of the actuating rod 18, and with the clutch member 8 provided with a gear 44, in mesh with a second intermediate gear 45, mounted upon a stud shaft 46, and in mesh with the elongated gear 35, on the intermediate shaft 34, thus shifting the actuating rods 18 and 27 to the right, to bring the cam surfaces 30 and 43 into operative position with the clutches b and e respectively, motion will be imparted from the driving shaft 5 through clutch b, gears 32, 33, intermediate shaft 34, gears 35, 45 and 44, clutch e, to the driven shaft 6.

When the shifting lever 25 is thrown to a position to disengage all of the cam surfaces from their respective clutch actuating pins of the several clutches, the transmission mechanism is in a neutral or idle condition, as shown in Fig. 2. In short, shifting the actuating rods 18 and 27, as a unit, so as to throw, first, clutch a into commission, a forward direct drive is obtained; second, throwing clutches c and b into commission, a second forward speed is obtained; third, clutches c and d, a third forward speed; and fourth, clutches b and e, a reverse speed is obtained.

It is obvious, that the cam surfaces upon the actuating rods are suitably spaced in order, if desirable, when two clutches are thrown into commission, one can be thrown in advance of the second, or both thrown simultaneously, as it is the relative spacing of the cam surfaces which controls the independent or serial actuation of the various clutches of the system. It is also obvious, that the range may be increased or decreased, without departing from the features of my invention.

Having described my invention, I claim:—

1. In a transmission mechanism, a driver and a driven shaft, clutching mechanism mounted intermediate of said shafts for connecting the same, gear mechanism having different speed values connecting said shafts, adapted to transmit motion around said clutching mechanism for an indirect drive, clutching mechanism concentric with said shafts, for connecting said gearing thereto, and means for controlling all of said clutching mechanisms selectively.

2. In a transmission mechanism, coaxially alined driving and driven shafts, friction clutch mechanism mounted thereon for connecting said shafts, gear mechanism having different speed values connecting said shafts adapted to transmit motion around said clutch mechanism for an indirect drive, friction clutch mechanism for each speed value of said gear mechanism, and clutch controlling means slidable within said shafts, provided with a series of clutch engaging cams adapted to selectively engage and operate all of the clutching mechanisms at predetermined limits of movement of said clutch controlling means.

3. In a transmission mechanism, a driving and a driven shaft relatively alined, intermediate transmission mechanism between said shafts, a series of friction clutch mechanisms concentric on said shafts for controlling the driving connections between said shafts and intermediate transmission mechanisms, and a single clutch controlling means for the combined series of clutching mechanisms, for selectively controlling the same.

4. In a transmission mechanism, a driver and a driven shaft, gear mechanism having different speed values connecting said shafts adapted to transmit motion intermediate thereof, a series of friction clutches mounted on said shafts, for directly connecting said shafts, or said shafts with said gear mechanism, for varying the driving relation between said shafts, means provided with a series of clutch engaging surfaces, for operating a respective clutch or clutches at predetermined limits of its movement for variously controlling the driving connections between said shafts.

5. In a transmission mechanism, a driver and a driven shaft, coacting friction clutch members relatively connected to the abutting ends of said shafts, means for frictionally uniting the same, gear mechanism having different speed values connecting said shafts adapted to transmit motion around said clutch member for an indirect drive, friction clutch members for each speed value of said gear mechanism, a clutch actuating rod provided with a series of clutch engaging surfaces relatively spaced, whereby in its movements, selective control of the clutches is had for producing a variety of forward speeds, reverse and neutral control of the shafts.

In testimony whereof, I have hereunto set my hand.

ERDIX ROUNDS.

Witnesses:
JNO. S. WRIGHT,
E. W. PEGRAM.

Copies of this patent may be obtained for five cents each, by addressing the "Commissioner of Patents, Washington, D. C."